United States Patent Office 3,099,684
Patented July 30, 1963

3,099,684
METHOD OF PREPARING TERTIARY PHOSPHINE OXIDES USING ELEMENTAL PHOSPHORUS
Michael M. Rauhut, Norwalk, and Andrew M. Semsel, Stamford, Conn., assignors to American Cyanamid Company, New York, N.Y., a corporation of Maine
No Drawing. Filed Apr. 7, 1961, Ser. No. 101,329
10 Claims. (Cl. 260—435)

The present invention relates to novel organo-phosphorus compounds and to the preparation of same. More particularly, the instant discovery concerns new and useful tertiary phosphine oxides prepared by a novel and straightforward method.

According to the present invention an alkyl acrylate of the formula

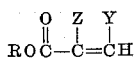

wherein R may be alkyl, branched or straight chain, having from 1 to 12 carbon atoms, Y may be H, lower alkyl, phenyl, or the like, and Z may be H, lower alkyl, and —CH$_2$CH$_2$COOR', wherein R' is alkyl (C$_1$–C$_{12}$), is reacted with elemental phosphorus and a strong base in the presence of water, as will be shown, to produce the corresponding tertiary phosphine oxide having the formula

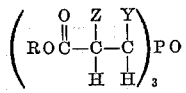

wherein R, R', Z and Y have the meaning given above.

Pursuant to a typical embodiment of the present invention the following reaction is made to take place

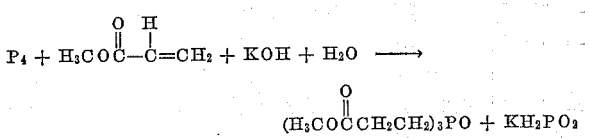

While the elemental phosphorus reactant employed in the equation just given is in a finely-divided solid state, the present invention contemplates the use of molten phosphorus, and therefore temperatures above the melting point of phosphorus, i.e., temperatures above 46° C. In fact, a wide range of temperatures is contemplated herein on the order of about 0° C. to about 175° C., preferably from 15° C. to 75° C.

By the same token, the reactions of the present invention may be carried out at atmospheric, sub-atmospheric and super-atmospheric pressures. At high temperatures, say, from 100° C.–175° C., super-atmospheric pressures are generally employed, as is evident to the person skilled in the art. Batch, continuous or semi-continuous processes may be employed.

According to a preferred embodiment, an aqueous strong base is employed. Typical strong bases within the purview of the instant discovery are the alkali metal hydroxides, the alkaline earth metal hydroxides, and the like, such as Na, Li, K hydroxide, Ca, Ba hydroxide, etc. If desired, reaction is made to take place in the presence of a solvent. Typical solvents are acetonitrile, alkanols, such as methanol, ethanol, propanol, butanol, t-butyl alcohol, ethers, such as dioxane, diethoxyethane, diethylether of diethylene glycol, tetrahydrofuran, and the like, dimethylformamide, dimethylsulfoxide, pyridine, and numerous other like solvents which under the conditions of the reaction do not interfere with the production of the desired products.

Typical acrylate reactants of the formula

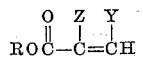

above, are methyl acrylate, ethyl acrylate, t-butyl acrylate, t-butyl methacrylate, 2-ethylhexylacrylate 2-ethylhexylcrotonate, 2-ethylhexylcinnamate, diethyl-2-methyleneglutarate, and the like.

Generally, the reactants contemplated herein are brought together in stoichiometric amounts, as demonstrated by the illustrative specific embodiment above. However, an excess of any of these reactants with respect to the other reactant may be employed and the amount of excess is governed by practicality.

The products of the present invention are useful as fire retardants for cotton cloth. For example, cotton cloth dipped, according to well-known procedures, in a suitable solution of any one of these tertiary phosphine oxides manifests desirable fire retardance.

The present invention will best be understood by virtue of the following examples which are merely illustrative and not intended to limit the scope of the invention, except insofar as the invention is described in the claims.

EXAMPLE I

*Tris(2-carbethoxyethyl)phosphine oxide*

To a well stirred mixture of 30.9 grams (1 gram atom) of finely divided white phosphorus, 170.2 grams (1.7 moles) of ethyl acrylate, and 300 milliliters of acetonitrile under nitrogen is added 50 milliliters (0.5 equivalent) of 10 N aqueous potassium hydroxide during 15 minutes. The temperature of the mildly exothermic reaction is maintained at 30° C.–35° C. After stirring for two additional hours at this temperature, the organic phase is carefully siphoned from the mixture of aqueous phase and unreacted phosphorus. The organic phase is neutralized with two drops of concentrated hydrochloric acid, dried over anhydrous sodium sulfate, and distilled under reduced pressure to obtain 12.7 grams of tris(2-carbethoxyethyl)phosphine oxide, boiling point 160° C.–180° C. (0.3 millimeter mercury). Upon redistillation an analytical sample is obtained, boiling point 199° C.–203° C. (0.2 millimeter mercury), $N_D^{25}$ 1.4682.

Analysis calculated for $C_{15}H_{27}O_7P$: C, 51.42; H, 7.77; P, 8.84. Found: C, 51.85; H, 7.58; P, 8.84.

EXAMPLE II–VIII

Example I, above, is repeated in every essential respect except as indicated in the following table:

TABLE I

| Ex. | Reactant | Solvent | Base | Temp. °C. | Product |
|---|---|---|---|---|---|
| II | Methyl acrylate | $CH_3CN$ | KOH | 75–100 | $(H_3COOCCH_2CH_2)_3PO$ |
| III | t-Butyl methacrylate | $C_2H_5OH$ | $Ba(OH)_2$ | 75–80 | $[(CH_3)_3COOC\underset{H}{\overset{CH_3}{C}}CH_2]_3PO$ |
| IV | Diethyl-2-methylene-glutarate | $(CH_3)_3COH$ | NaOH | 25–50 | $\left(H_5C_2OOCCH_2CH_2\underset{COOC_2H_5}{\overset{H}{C}}-CH_2\right)_3PO$ |
| V | t-Butyl acrylate | $(CH_3)_3COH$ | KOH | 35–40 | $[(CH_3)_3COOCCH_2CH_2]_3PO$ |
| VI | 2-ethylhexylacrylate | $CH_3CN$ | KOH | 35–40 | $(H_9C_4\underset{C_2H_5}{CH}CH_2OOCCH_2CH_2)_3PO$ |
| VII | 2-ethylhexylcrotonate | Dimethyl-formamide | $Ca(OH)_2$ | 80–100 | $(H_9C_4\underset{C_2H_5}{CH}CH_2OOCCH_2CHCH_3)_3PO$ |
| VIII | 2-ethylhexylcinnamate | 2-ethylhexanol | $Ca(OH)_2$ | 80–100 | $(H_9C_4\underset{C_2H_5}{CH}CH_2OOCCH_2CHC_6H_5)_3PO$ |

According to still further embodiments of the present invention the acrylate reactants of the formula $$RO\overset{O}{\overset{\|}{C}}-\overset{Z}{\underset{}{C}}=\overset{Y}{\underset{}{CH}}$$

given hereinabove may be replaced by vinyl methyl ketone, tetrafluoroethylene, chlorotrifluoroethylene, vinyl methyl sulfone, and the like, to produce the corresponding tertiary phosphine oxides.

EXAMPLES IX–XII

The following table in which the process essentially according to Example I, above, is repeated illustrates these embodiments.

TABLE II

| Ex. | Reactant | Solvent | Base | Temp. °C. | Product |
|---|---|---|---|---|---|
| IX | Vinyl methyl ketone | $CH_3CN$ | KOH | 30–35 | $(CH_3\overset{O}{\overset{\|}{C}}CH_2CH_2)_3PO$ |
| X | Tetrafluoroethylene [1] | Dimethylformamide | NaOH | 0–40 | $(F_2CHCF_2)_3PO$ |
| XI | Vinyl methyl sulfone | t-Butanol | NaOH | 50–75 | $(CH_3\overset{O}{\underset{O}{\overset{\|}{\underset{\|}{S}}}}CH_2CH_2)_3PO$ |
| XII | Chlorotrifluoroethylene | Pyridine | NaOH | 0–40 | $(ClFHCCF_2)_3P=O$ |

[1] Run in closed system (autoclave) at 50–200 pounds per square inch gauge.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

While Examples IX through XII define further reactants which, like the alkyl acrylates described hereinabove, have electronegative substituents, the present invention is not restricted to alkyl acrylates and said additional reactants (IX–XII). By electronegative substituent is meant a substituent having a sigma (para) constant greater than about +0.3, where the sigma constant is defined in "A Reevaluation of the Hammett Equation," by H. H. Jaffé, Chem.

Reves., 53, 191 (1957). Typical examples of these substituents follow:

| Substituent | $\sigma_p$ |
|---|---|
| —CN | 0.628 |
| —$\overset{O}{\overset{\|}{C}}$C$_6$H$_5$ | 0.459 |
| —$\overset{O}{\overset{\|}{C}}$CH$_3$ | 0.516 |
| —$\overset{O}{\overset{\|}{C}}$OC$_2$H$_5$ | 0.522 |
| —CF$_3$ | 0.551 |
| —$\overset{\oplus}{N}$(CH$_3$)$_3$ | 0.859 |
| —$\overset{O}{\overset{\|}{S}}$CH$_3$ | 0.567 |
| —$\underset{\overset{\|}{O}}{\overset{O}{\overset{\|}{S}}}$CH$_3$ | 0.728 |
| —$\underset{\overset{\|}{O}}{\overset{O}{\overset{\|}{S}}}$NH$_2$ | 0.621 |

We claim:
1. A method of preparing a tertiary phosphine oxide of the formula

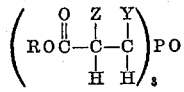

wherein R is alkyl, branched and straight chain, having from 1 to 12 carbon atoms, Y is selected from the group consisting of hydrogen, lower alkyl and phenyl, and Z is selected from the group consisting of hydrogen, lower alkyl, and —CH$_2$CH$_2$COOR′, wherein R′ is alkyl (C$_1$–C$_{12}$) which comprises reacting an alkyl acrylate of the formula

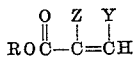

wherein R, Z and Y have the meanings given above, with elemental phosphorus, a base, and water, in the presence of an inert solvent, and recovering the corresponding tertiary phosphine oxide.

2. The method of claim 1 wherein the alkyl acrylate is ethyl acrylate.
3. The method of claim 1 wherein the alkyl acrylate is methyl acrylate.
4. The method of claim 1 wherein the alkyl acrylate is t-butyl methacrylate.
5. The method of claim 1 wherein the alkyl acrylate is t-butyl acrylate.
6. A method of preparing a tertiary phosphine oxide which comprises reacting, in the presence of an inert solvent, elemental phosphorus, a base and water with a member selected from the group consisting of tetrafluoroethylene, chlorotrifluoroethylene, and a vinyl reactant in which the vinyl moiety is substituted with an electronegative substituent having a sigma (para) constant greater than about +0.3, and recovering the corresponding tertiary phosphine oxide.
7. The method of claim 6 wherein the reactant is vinyl methyl ketone.
8. The method of claim 6 wherein the reactant is tetrafluoroethylene.
9. The method of claim 6 wherein the reactant is vinyl methyl sulfone.
10. The method of claim 6 wherein the reactant is chlorotrifluoroethylene.

References Cited in the file of this patent

Kosolapoff: Organo-Phosphorous Compounds, John Wiley and Sons, Inc., 1950, pages 108–109.

Rauhut et al.: Journal of the American Chemical Society, vol. 81, No. 5, Mar. 5, 1959, pages 1103–1107.